(12) United States Patent
Speier et al.

(10) Patent No.: US 8,078,803 B2
(45) Date of Patent: Dec. 13, 2011

(54) APPARATUS AND METHODS TO REDUCE CASTOUTS IN A MULTI-LEVEL CACHE HIERARCHY

(75) Inventors: Thomas Philip Speier, Holly Springs, NC (US); James Norris Dieffenderfer, Apex, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 11/669,245

(22) Filed: Jan. 31, 2007

(65) Prior Publication Data

US 2008/0183967 A1    Jul. 31, 2008

(51) Int. Cl.
    *G06F 12/00* (2006.01)
(52) U.S. Cl. ......... 711/122; 711/133; 711/144; 711/156
(58) Field of Classification Search .................... None
    See application file for complete search history.

(56) References Cited

U.S. PATENT DOCUMENTS

| | | | |
|---|---|---|---|
| 5,564,035 A * | 10/1996 | Lai | ................ 711/144 |
| 5,787,478 A | 7/1998 | Hicks et al. | |
| 6,282,615 B1 | 8/2001 | Arimilli et al. | |
| 6,564,301 B1 | 5/2003 | Middleton | |

FOREIGN PATENT DOCUMENTS

| | | |
|---|---|---|
| RU | 2212704 C2 | 9/2003 |
| WO | WO9950752 A1 | 10/1999 |
| WO | WO2006102885 A2 | 9/2006 |

OTHER PUBLICATIONS

International Search Report-PCT/US08/052507, International Search Authority-European Patent Office-7-1-08.
Written Opinion-PCT/US08/052507, International Search Authority-European Patent Office-7-1-08.

* cited by examiner

*Primary Examiner* — Shawn X Gu
(74) *Attorney, Agent, or Firm* — Peter M. Kamarchik; Nicholas J. Pauley; Jonathan T. Velasco

(57) ABSTRACT

Techniques and methods are used to control allocations to a higher level cache of cache lines displaced from a lower level cache. The allocations of the displaced cache lines are prevented for displaced cache lines that are determined to be redundant in the next level cache, whereby castouts are controlled. To such ends, a line is selected to be displaced in a lower level cache. Information associated with the selected line is identified which indicates that the selected line is present in a higher level cache. An allocation of the selected line in the higher level cache is prevented based on the identified information.

29 Claims, 3 Drawing Sheets

APPARATUS AND METHODS TO REDUCE CASTOUTS IN A MULTI-LEVEL CACHE HIERARCHY

FIELD OF THE DISCLOSURE

The present disclosure relates generally to the field of cache memory and, more specifically, to memory systems with instruction, data, and victim caches.

BACKGROUND

Many portable products, such as cell phones, laptop computers, personal data assistants (PDAs) or the like, utilize a processor executing programs, such as, communication and multimedia programs. The processing system for such products includes a processor and memory complex for storing instructions and data. Large capacity main memory commonly has slow access times as compared to the processor cycle time. As a consequence, the memory complex is conventionally organized in a hierarchy based on capacity and performance of cache memories, with the highest performance and lowest capacity cache located closest to the processor. For example, a level 1 instruction cache and a level 1 data cache would generally be directly attached to the processor. While a level 2 unified cache is connected to the level 1 (L1) instruction and data caches. Further, a system memory is connected to the level 2 (L2) unified cache. The level 1 instruction cache commonly operates at the processor speed and the level 2 unified cache operates slower than the level 1 cache, but has a faster access time than that of the system memory. Alternative memory organizations abound, for example, memory hierarchies having a level 3 cache in addition to an L1 and an L2 cache. Another memory organization may use only a level 1 cache and a system memory.

A memory organization may be made up of a hierarchy of caches operating as inclusive caches, strictly inclusive caches, exclusive caches, or a combination of these cache types. By definition herein, any two levels of cache that are exclusive to each other can not contain the same cache line. Any two levels of cache that are inclusive of each other may contain the same cache line. Any two levels of cache that are strictly inclusive of each other means that the larger cache, usually a higher level cache, must contain all lines that are in the smaller cache, usually a lower level cache. In a three or more multi-level cache memory organization, any two or more cache levels may operate as one type of cache, such as exclusive, and the remaining cache levels may operate as one of the alternative types of cache, such as inclusive.

An instruction cache is generally constructed to support a plurality of instructions located at a single address in the instruction cache. A data cache is generally constructed to support a plurality of data units located at a single address in the data cache, where a data unit may be a variable number of bytes depending on the processor. This plurality of instructions or data units is generally called a cache line or simply a line. For example, a processor fetches an instruction or a data unit from an L1 cache and if the instruction or data unit is present in the cache a "hit" occurs and the instruction or data unit is provided to the processor. If the instruction or data unit is not present in the L1 cache a "miss" occurs. A miss may occur on an instruction or data unit access anywhere in a cache line. When a miss occurs, a line in the cache is replaced with a new line containing the missed instruction. A replacement policy is used to determine which cache line to replace. For example, selecting or victimizing a cache line that has been used the least represents a least recently used (LRU) policy. The cache line selected to be replaced is the victim cache line.

A cache line may also have associated with it a number of status bits, such as a valid bit and a dirty bit. The valid bit indicates that instructions or data reside in the cache line. The dirty bit indicates whether a modification to the cache line has occurred. In a write-back cache, the dirty bit indicates that when a cache line is to be replaced the modifications need to be written back to the next higher memory level in the memory system hierarchy.

A victim cache may be a separate buffer connected to a cache, such as a level 1 cache, or integrated in an adjacent higher level cache. Victim cache lines may be allocated in the victim cache under the assumptions that a victim line may be needed relatively shortly after being evicted and that accessing the victim line when needed from a victim cache is faster than accessing the victim line from a higher level of the memory hierarchy. With a victim cache integrated in an adjacent higher level cache, a castout occurs when a line is displaced from the lower level cache and is allocated in the higher level cache, thus caching the lower level cache's victims. The lower level cache sends all displaced lines, both dirty and non-dirty, to the higher level cache. In some cases, the victim line may already exist in the victim cache and rewriting already existing lines wastes power and reduces bandwidth to the victim cache.

SUMMARY

The present disclosure recognizes that reducing power requirements in a memory system is important to portable applications and in general for reducing power needs in processing systems. To such ends, an embodiment of the invention addresses a tracking method to reduce allocation of displaced cache lines. A line is selected to be displaced in a lower level cache. Information associated with the selected line is identified which indicates that the selected line is present in a higher level cache. An allocation of the selected line in the higher level cache is prevented based on the identified information. Preventing an allocation of the selected line saves power that would be associated with the allocation.

Another embodiment of the invention addresses a method to reduce castouts. In response to a miss in a level X cache, allocation information is saved in the level X cache in a tag of a cache line associated with the miss. The allocation information indicates whether the cache line was allocated in a level X+1 cache. A line is selected to be replaced in the level X cache. A castout of the selected line from the level X cache to the level X+1 cache is prevented in response to the allocation information of the selected line indicating the cache line was allocated in the level X+1 cache.

Another embodiment of the invention addresses a memory system having a plurality of cache levels. A lower level cache is configured to store a plurality of first cache lines each with an allocation bit. The allocation bit associated with one of the plurality of first cache lines indicates whether the one of the plurality of first cache lines was allocated in a higher level cache. A castout logic circuit is configured to determine whether a first cache line selected for displacement from the plurality of first cache lines is a cache line that is redundant with a cache line in the higher level cache based on the allocation bit associated with the selected first cache line. A castout of the selected first cache line to the higher level cache is prevented in response to the allocation bit of the selected first cache line.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
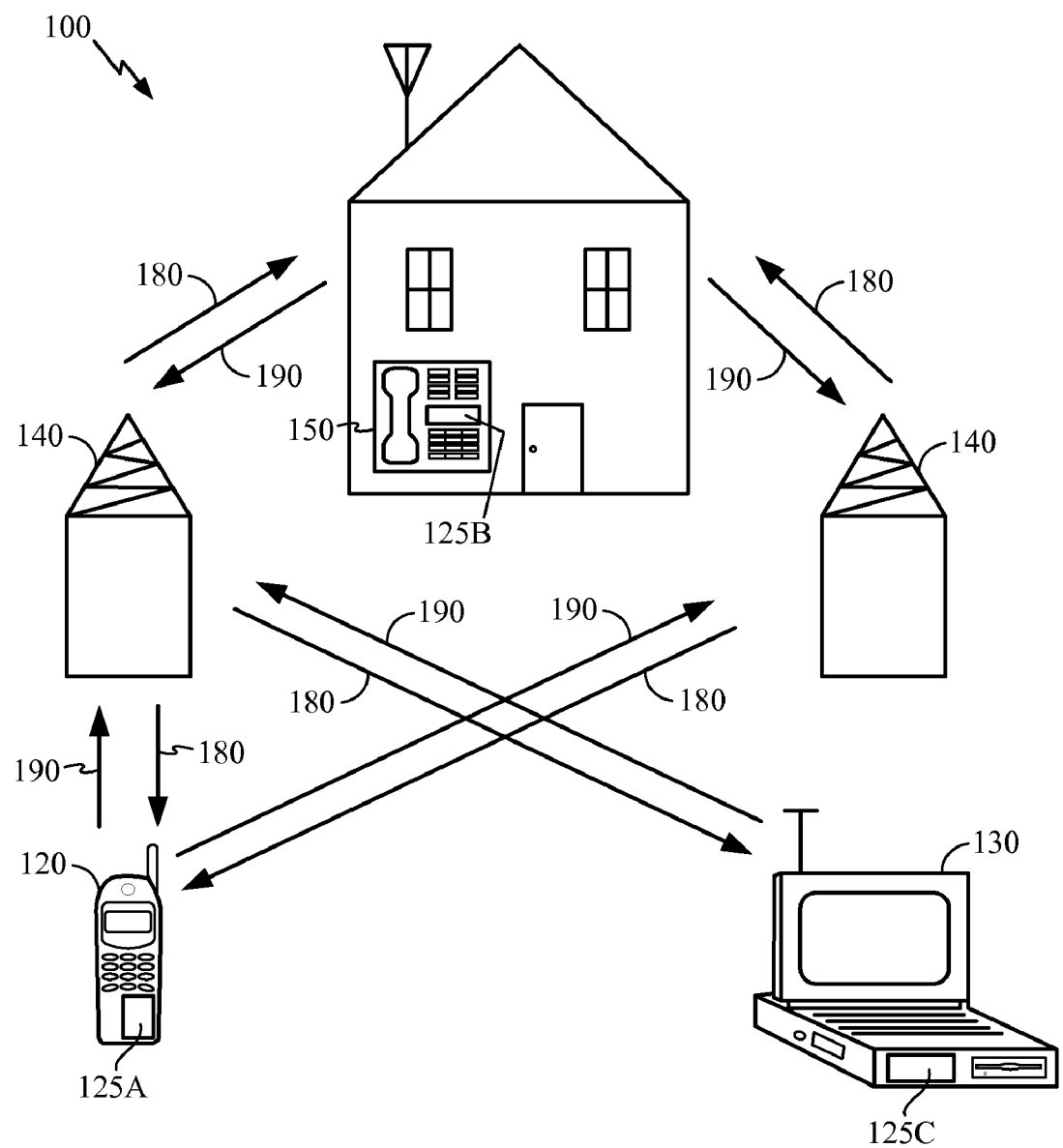
FIG. 1 illustrates a wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, and 150 include hardware components, software components, or both as represented by components 125A, 125C, and 125B, respectively, which have been adapted to embody the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, handheld personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having a processor with at least two levels of a memory hierarchy, such as a level 1 cache and a level 2 cache.

Figure 2:
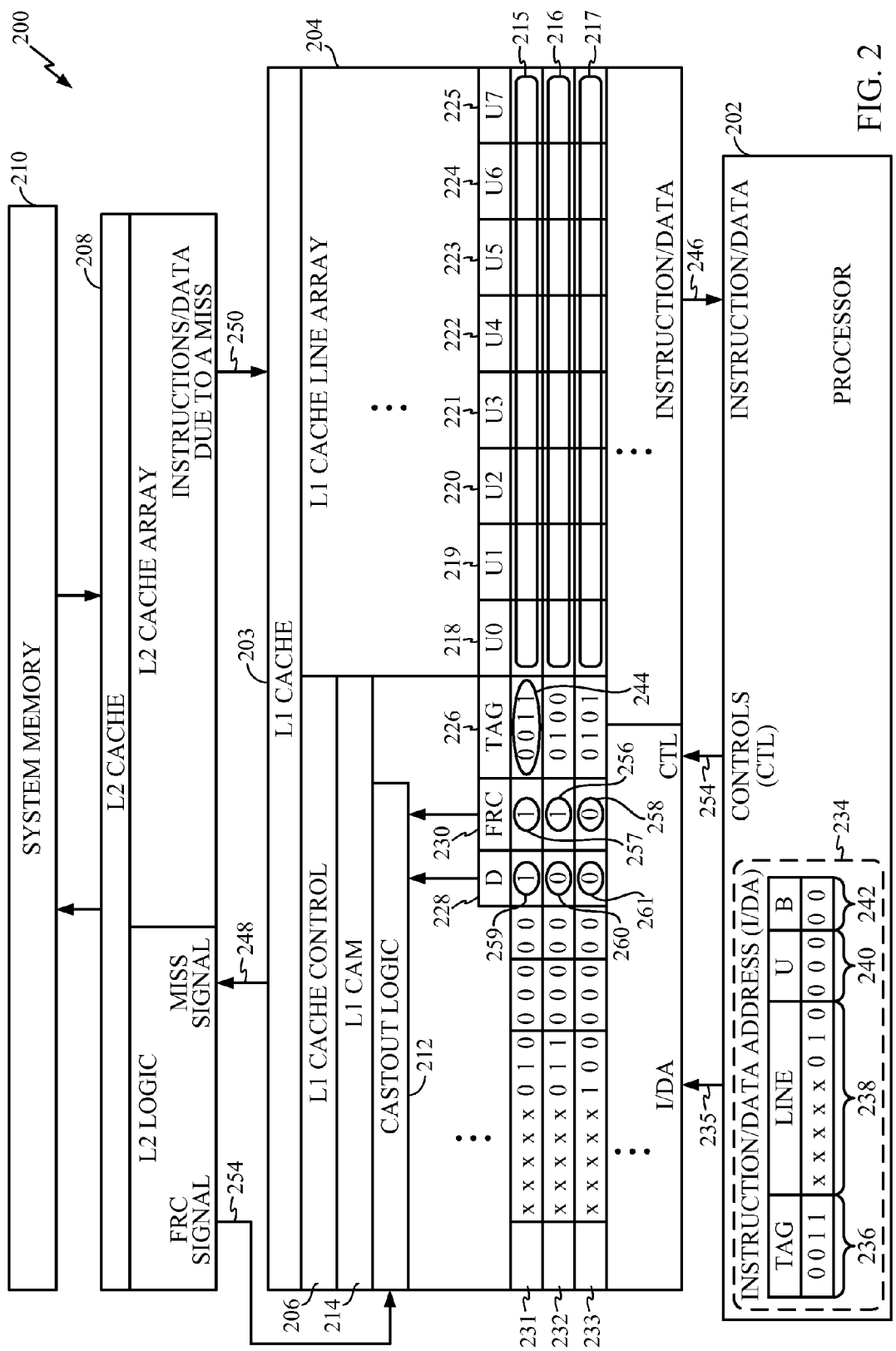
FIG. 2 is a functional block diagram of an exemplary processor and memory complex in which castouts are reduced.

FIG. 2 is a functional block diagram of an exemplary processor and memory complex 200 in which castouts are reduced. The exemplary processor and memory complex 200 includes a processor 202, a level 1 cache (L1 cache) 203 comprising an L1 cache line array 204 and an L1 cache control unit 206, an inclusive level 2 cache (L2 cache) 208, and a system memory 210. The L1 cache control unit 206 includes castout logic circuit 212 and a level 1 content addressable memory (L1 CAM) 214 for tag matching, as may be used in various types of caches, such as, a set associative cache or a fully associative cache. Peripheral devices, which may connect to the processor complex, are not shown for clarity of discussion. The exemplary processor and memory complex 200 may be suitably employed in various embodiments of the invention in components 125A-C for executing program code that is stored in the caches 203 and 208 and the system memory 210.

The L1 cache line array 204 may include a plurality of lines, such as cache lines 215-217. In one embodiment, the L1 cache 203 is a data cache with each line made up of a plurality of data units. In another embodiment, the L1 cache 203 is an instruction cache with each line made up of a plurality of instructions. In a further embodiment, the L1 cache 203 is a unified cache with each line made up of a plurality of instructions or data units. For example, each line is made up of a plurality of elements (U0, U1, ..., U7) 218-225, respectively, appropriate for the instantiated cache embodiment. Associated with each line is a tag 226, a dirty bit (D) 228, and a force replacement castout bit (FRC) 230, as will be discussed in greater detail below. The cache lines 215-217 reside in the L1 cache line array 204 at line addresses 231-233, respectively. The L1 cache control unit 206 contains address control logic responsive to an instruction address or data address (I/DA) 234 received over I/DA interface 235 to access cache lines. The I/DA 234 may be made up of a tag 236, a line address field 238, an instruction/data "U" field 240, and a byte "B" field 242.

In order to fetch an instruction or a data unit in the exemplary processor and memory complex 200, the processor 202 generates an instruction/data address (I/DA) 234 of the desired instruction/data to be fetched and sends the fetch address to the L1 cache control unit 206. Based on the received I/DA 234, the L1 cache control unit 206 checks to see if the instruction or data is present in the L1 cache line array 204. This check is accomplished, for example, through the use of comparison logic that checks for a matching tag 244 associated with line 215 which was selected by the I/DA 234. If the instruction or data is present, a match or a hit occurs and the L1 cache control unit 206 indicates that the instruction or data is present in the L1 cache 203. If the instruction or data is not present, no match or a miss will be found and the L1 cache control unit 206 provides a miss indication that the instruction or data is not present in the L1 cache 203.

If the instruction or data is present, the instruction or data at the instruction/data fetch address is selected from the L1 cache line array 204. The instruction or data is then sent on instruction/data out bus 246 to the processor 202.

If the instruction/data is not present in the cache, miss information is provided to the L2 cache 208 by a miss signal 248 indicating a miss has occurred. Upon detecting a miss in the L1 cache 203, an attempt is made to fetch the desired instruction/data from the L2 cache 208. If the desired instruction/data is present in the L2 cache 208, it is provided on a memory bus interface 250. If the desired instruction/data is not present in the L2 cache 208, it is fetched from system memory 210.

A force replacement castout (FRC) signal 254 from the L2 cache 208 is sent to the lower L1 cache 203 along with the desired instruction/data sent on the memory bus interface 250. The FRC signal 254 indicates whether or not the supplied instruction/data was obtained due to a hit in the upper level L2 cache 208. For example, the FRC signal 254 in a "0"

state indicates the desired instruction/data was supplied from the L2 cache 208. The FRC signal 254 in a "1" state indicates the desired instruction/data was supplied from another level memory above the L2 cache 208, such as from the system memory 210. The FRC signal 254 is stored in the L1 cache 203, for example, as FRC bits 256-258 along with a tag associated with the appropriate cache line, such as lines 215-217. When the requested line is a miss in the L2 cache 208 and the L1 cache 203, the L1 cache 203 is supplied by the next level of memory above the L2 cache 208, whereas the L2 cache 208 does not allocate the line at the time of the miss.

When a lower level cache must displace a line, the line may be allocated in the next level cache in response to information stored with the line in the lower level cache. For example, when a lower level cache, such as the L1 cache 203, selects a line to be displaced, such as cache line 215, with a dirty indication, as indicated by the dirty bit 259 in a "1" state, the castout logic circuit 212 makes a determination that the cache line 215 is to be allocated to the next level of the memory hierarchy. If a cache line is selected to be displaced that is not dirty, such as cache line 216 with the dirty bit 260 in a "0" state, and has its associated FRC bit 256 set active, for example, to a "1" state, the cache line 216 is also allocated to the next level of the memory hierarchy. The FRC bit 256 is set active in response to an FRC signal 254 indication provided by the next level of the memory hierarchy that the line was not found in its directory. If a cache line which is selected to be replaced is not dirty, such as cache line 217 with its dirty bit 261 in a "0" state, and has an associated FRC bit 258 set inactive, for example, to a "0" state, the cache line 217 is not allocated to the next level of the memory hierarchy. A castout is not required due to the line being not dirty and the FRC bit 258 indicating by its inactive state that this cache line 217 is present in the next level of the memory hierarchy. In short, the higher level cache allocates a cache line, in response to a displaced cache line in a lower level, when the dirty bit is set or the FRC bit is set. Through such use of the FRC bit, redundant castouts are suppressed thereby saving power and access cycles by avoiding unnecessary accesses to upper levels of the memory hierarchy.

Figure 3:
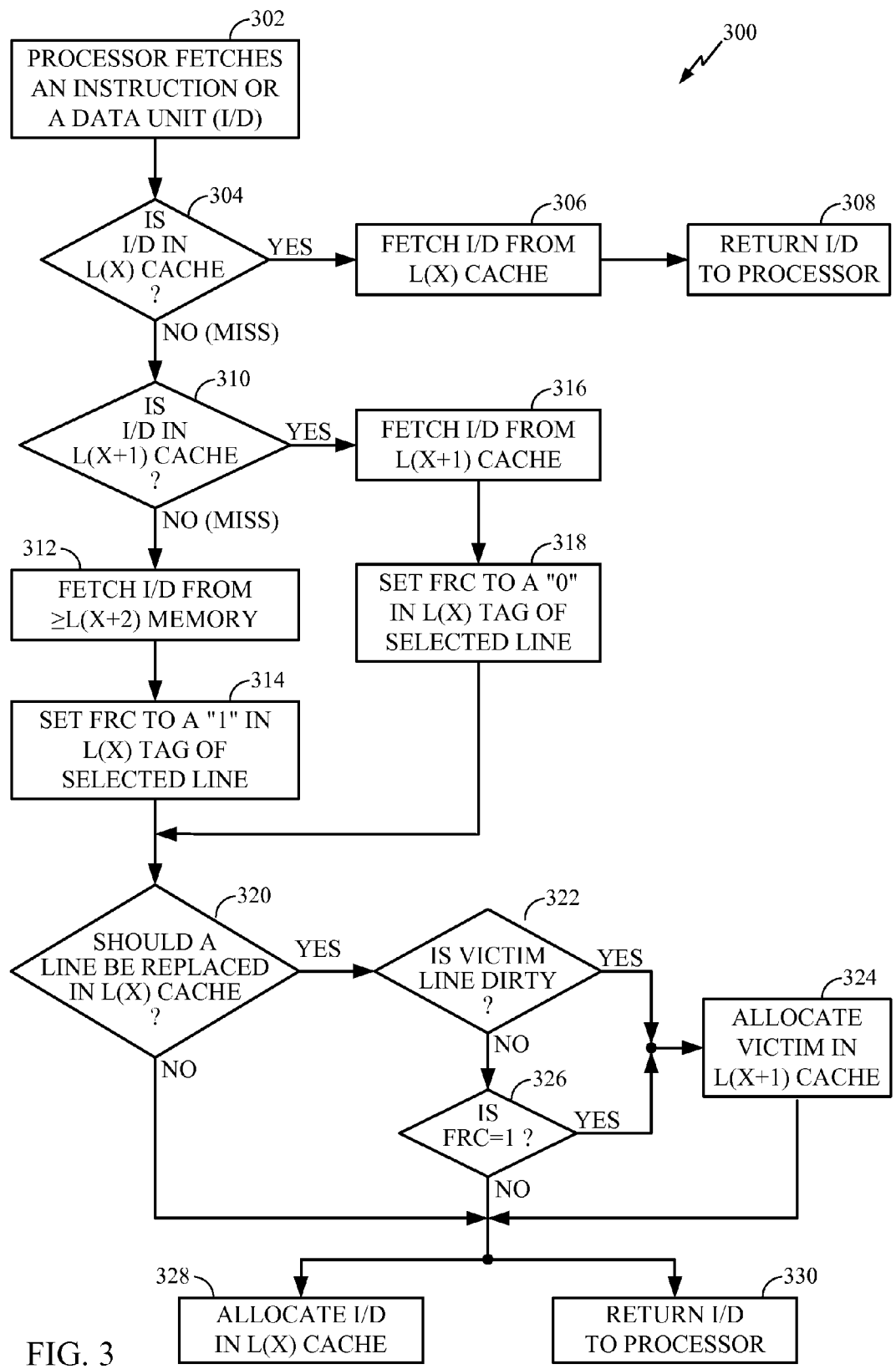
FIG. 3 is a flow diagram illustrating a process for reducing castouts.

FIG. 3 is a flow diagram illustrating a process 300 for reducing castouts. In the process 300, a memory level is indicated by indexes (X), (X+1), or (X+2), where, for example, with X=1, an L1, an L2, and an L3 memory level may be indicated. Also, descriptions of the blocks of process 300 include reference numbers to functional elements in FIG. 2.

The process 300 begins with a processor, such as processor 202, that fetches an instruction or a data unit at block 302. At decision block 304, it is determined whether the instruction/data requested can be located in an L(X) cache, such as the L1 cache 203. If the instruction/data can be located, the requested instruction/data is fetched from the L(X) cache at block 306 and the instruction/data is returned to the processor at block 308.

If the instruction/data cannot be located in the L(X) cache, a miss indication is generated and at decision block 310 it is determined whether the instruction/data requested can be located in an L(X+1) cache, such as the L2 cache 208. If the instruction/data can be located, the requested instruction/data is fetched from the L(X+1) cache at block 316. At block 318, the force replacement castout (FRC) bit, such as FRC bit 258, is set to a "0" state in a tag line, such as associated with cache line 217, of the L1 cache 203 in order for the L1 cache 203 to prevent sending this instruction/data to the L2 cache 208. The process 300 then proceeds to decision block 320.

Returning to block 310, if the instruction/data cannot be located in the L(X+1) cache, a miss indication is generated. At block 312, the requested instruction/data is fetched from a level of the memory hierarchy that is greater than or equal to the L(X+2) level, such as, an L3 cache or the system memory 210 of the processor and memory complex 200. At block 314, the FRC bit, for example, the FRC bit 256 is set to a "1" state, and is stored with the tag associated with the selected line, such as cache line 216.

At decision block 320, it is determined whether a line should be replaced in the L(X) cache, such as the L1 cache 203. If it is determined that a line should be replaced in the L(X) cache, it is further determined at decision block 322 whether the selected line, a victim line, is dirty, such as indicated by dirty bit 259 in a "1" state. If the selected victim line is dirty, the victim line is allocated at block 324 in the L(X+1) cache, such as the L2 cache 208. If the selected victim line is not dirty, such as indicated by dirty bits 260 and 261, the FRC bit is checked to determined whether it is set active in decision block 326. If at decision block 326 it is determined that the FRC bit is active, such as is the case for FRC bit 256, the victim line is allocated at block 324 in the L(X+1) cache, such as the L2 cache 208.

If it is determined at decision block 320 that a line should not be replaced or if at decision block 326 it is determined that the FRC bit is inactive, such as in a "0" state, as is the case for FRC bit 258, the requested instruction/data is allocated at block 328 in the L(X) cache, such as the L1 cache 203. The requested instruction/data is also returned at block 330 to the requesting processor, such as processor 202. In such manner, a redundant castout to the L(X+1) cache is avoided, thereby saving power and improving cache access bandwidth in the memory hierarchy.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the invention is disclosed in the context of illustrative embodiments for instruction caches, data caches, and other types of caches, it will be recognized that a wide variety of implementations may be employed by persons of ordinary skill in the art consistent with the above discussion and the claims which follow below.

What is claimed is:

1. A tracking method to reduce allocation of displaced cache lines, the tracking method comprising:
accessing a selected line to be displaced in a lower level cache in response to a memory access having a fetch address hit in a next higher level cache;
identifying information associated with the selected line which indicates that the selected line is not present in the next higher level cache; and
allocating, for the memory access having the fetch address hit in the next higher level cache, the selected line in the next higher level cache in response to the identified information and an allocation indication associated with a cache line in the lower level cache, wherein the allocation indication signifies the cache line is present in the next higher level cache.

2. The tracking method of claim 1 further comprising:
saving, in response to a miss in the lower level cache, the allocation indication with a tag of the cache line allocated in the lower level cache due to the miss.

3. The tracking method of claim 1 further comprising:
identifying the selected line as being dirty; and
allocating the selected line in the next higher level cache.

4. The tracking method of claim 1 further comprising:
determining that the identified information includes an asserted force replacement castout (FRC) bit associated with the selected line signifies the selected line is not present in the next higher level cache; and
allocating the selected line in the next higher level cache.

5. The tracking method of claim 1 wherein, a dirty bit that is not asserted indicates the selected line has not been modified.

6. The tracking method of claim 1 further comprising:
fetching a data unit from the next higher level cache; and
setting the allocation indication to a state that signifies the data unit is present in the next higher level cache.

7. The tracking method of claim 1 further comprising:
fetching a data unit from a level of the memory hierarchy above the next higher level cache; and
setting the allocation indication to a state that signifies the data unit is not present in the next higher level cache.

8. The tracking method of claim 1 wherein the next higher level cache operates as a victim cache.

9. The tracking method of claim 1, further comprising:
preventing an allocation of the cache line in the next higher level cache based on the allocation indication that signifies the cache line is present in the next higher level cache and information stored with the cache line in the lower level cache that indicates the cache line has not been modified.

10. The tracking method of claim 9, wherein the allocation indication is a bit in the lower level cache that affects power use by preventing the allocation of the cache line in the next higher level cache.

11. The tracking method of claim 1, further comprising:
preventing access cycles associated with an allocation of the cache line in the next higher level cache based on the allocation indication that signifies the cache line is present in the next higher level cache and information stored with the cache line in the lower level cache that indicates the cache line has not been modified.

12. The method of claim 1 wherein the selected line is allocated at an address in the next higher level cache determined by a least recently used replacement policy of the next higher level cache.

13. The tracking method of claim 1 further comprising:
identifying second information associated with the selected line which indicates that the selected line is present in the next higher level cache and has not been modified; and
preventing an allocation of the selected line in the next higher level cache in response to the identified second information.

14. A method to reduce castouts, the method comprising:
accessing a selected line to be displaced in a level X cache in response to a memory access having a fetch address hit in a level X+1 cache;
allocating, for the access having the fetch address hit in the level X+1 cache, the selected line in the level X+1 cache in response to an allocation bit of the selected line indicating the selected line is not present in the level X+1 cache and a cache line and an allocation bit associated with the cache line in the level X cache, wherein the allocation bit associated with the cache line allocated in the level X cache signifies the cache line is present in the level X+1 cache.

15. The method of claim 14 further comprising:
identifying the selected line as being dirty; and
allocating the selected line in the level X+1 cache.

16. The method of claim 14 further comprising:
determining that the allocation bit associated with the selected line indicates the selected line is not present in the level X+1 cache and a dirty bit indicates the selected line is not dirty; and
allocating the selected line in the level X+1 cache.

17. The method of claim 14 wherein, a dirty bit that is not asserted indicates the selected line has not been modified.

18. The method of claim 14 further comprising:
fetching a data unit from the level X+1 cache; and
setting the allocation bit associated with the cache line in the level X cache to a state that signifies the data unit is present in the level X+1 cache.

19. The method of claim 14 further comprising:
fetching a data unit from a level of a memory hierarchy above the level X+1 cache; and
setting the allocation bit associated with the cache line in the level X cache to a state that signifies the data unit is not present in the level X+1 cache.

20. The method of claim 14 wherein the selected line is allocated at an address in the level X+1 cache determined by a least recently used replacement policy of the level X+1 cache.

21. The method of claim 14, further comprising:
preventing a castout of the selected line from the level X cache to the level X+1 cache in response to an allocation bit of the selected line indicating the selected line is present in the level X+1 cache.

22. A memory system having a plurality of cache levels comprising:
a lower level cache configured to store a plurality of first cache lines each with an allocation bit, each allocation bit indicating whether one of the plurality of first cache lines associated with the allocation bit was allocated in a next higher level cache; and
a castout logic circuit configured to determine whether a first cache line selected for displacement from the plurality of first cache lines is a cache line that is redundant with a cache line in the next higher level cache based on an allocation bit associated with the selected first cache line in response to a memory access having a fetch address hit in the next higher level cache, to avoid a castout of the selected first cache line to the next higher level cache in response to the allocation bit of the selected first cache line that indicates the selected first cache line is redundant with a cache line in the next higher level cache, and to castout the selected first cache line to the next higher level cache, based on the allocation bit indicating the selected first cache line is not present in the next higher level cache for the access having the fetch address hit in the next higher level cache, wherein a cache line and an associated allocation bit are stored in the lower level cache for the access having the fetch address hit in the next higher level cache, the associated allocation bit signifies the cache line is present in the next higher level cache.

23. The memory system of claim 22 wherein the next higher level cache comprises:
  a plurality of second cache lines; and
  a logic circuit, in response to a miss in the lower level cache, configured to generate an allocation signal based on whether a cache line associated with the miss was allocated in the next higher level cache, the allocation signal communicated to the lower level cache for storage as the allocation bit in the cache line associated with the miss.

24. The memory system of claim 23 wherein the castout logic circuit further comprises setting the allocation bit in the cache line associated with the miss to the state of the allocation signal.

25. The memory system of claim 23 wherein the next higher level cache is an inclusive cache.

26. The memory system of claim 22 wherein the lower level cache is a data cache.

27. The memory system of claim 22 wherein the selected first cache line is castout to an address in the next higher level cache determined by a least recently used replacement policy of the next higher level cache.

28. A tracking method to reduce allocation of displaced cache lines, the tracking method comprising:
  accessing a selected line to be displaced in a lower level cache in response to a memory access having a fetch address hit in a next higher level cache;
  identifying information associated with the selected line which indicates that the selected line is not present in the next higher level cache; and
  allocating, for the memory access having the fetch address hit in the next higher level cache, the selected line in response to the identified information at an address in the next higher level cache determined by a least recently used replacement policy of the next higher level cache.

29. The tracking method of claim 28, further comprising:
  allocating, for the memory access having the fetch address hit in the next higher level cache, an allocation indication associated with a cache line in the lower level cache, wherein the allocation indication signifies the cache line is present in the next higher level cache.

* * * * *